Jan. 10, 1967  J. L. COLODNER  3,297,835
MOVING PICTURE CAMERA SWITCH WITH IMPROVED ROTARY
CONTACT DISC STRUCTURE
Filed March 12, 1965
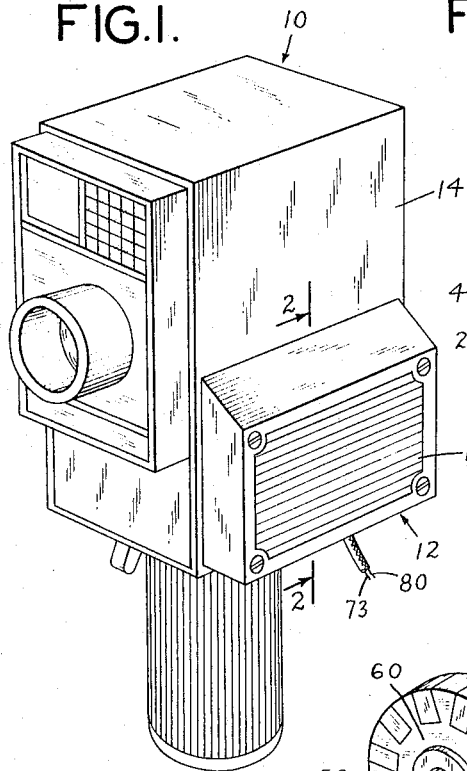
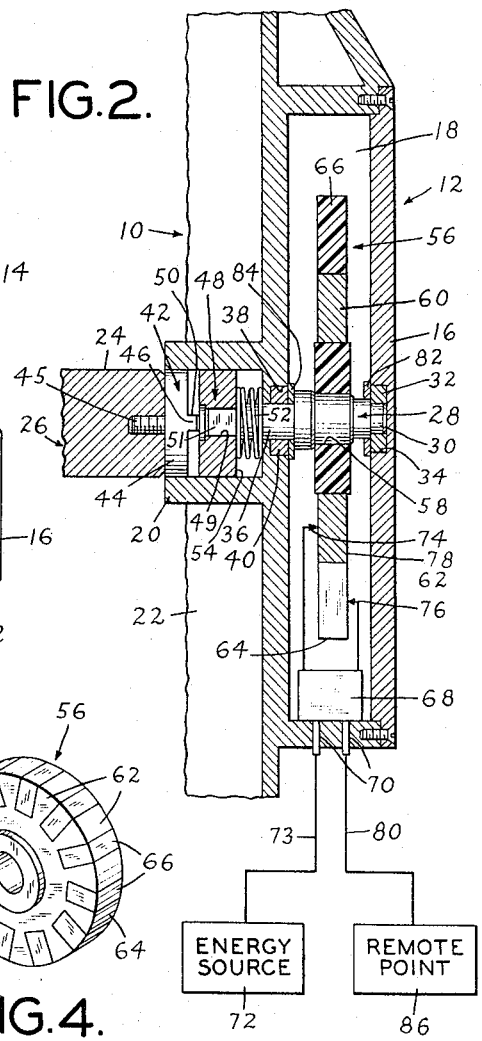
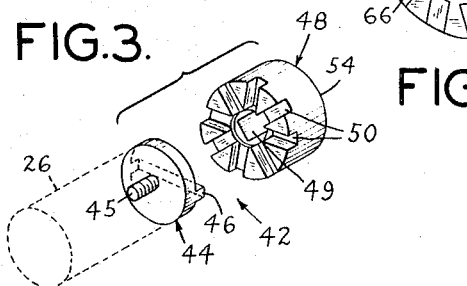
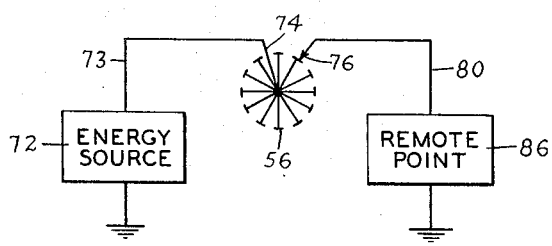
INVENTOR
JESSE L. COLODNER
BY
Bertram Frank
ATTORNEY

United States Patent Office 3,297,835
Patented Jan. 10, 1967

3,297,835
MOVING PICTURE CAMERA SWITCH WITH IMPROVED ROTARY CONTACT DISC STRUCTURE
Jesse L. Colodner, Pearl River, N.Y., assignor to International Camera Corporation, New York, N.Y., a corporation of New York
Filed Mar. 12, 1965, Ser. No. 439,357
12 Claims. (Cl. 200—11)

This invention relates to a moving picture camera and more particularly to a moving picture camera which also provides a synchronous pulse.

For many years attempts have been made to apply sound to 8 mm. motion picture films. Of course, laboratory 8 mm. talking picture movie cameras have been made, however the cost of making and distributing these types of cameras commercially, has been prohibitive.

In recent years attempts have been made to commercialize an 8 mm. home talking moving picture camera. However, the cameras marketed have exhibited so many disadvantages that many persons have felt that 8 mm. talking moving picture cameras are not practical under present technology.

The primary disadvantage appears to reside in the fact it was very difficult and certainly very expensive to synchronize the film with the lip movements of the subject. This of course does not raise any problems for musical backgrounds which may be "dubbed' into films, but does present very serious problems when the subject being photographed is a person talking or singing. The application of sound to film may be made in a variety of manners, however, heretofore these applications have been so expensive that public acceptance of the 8 mm. talking picture films has been limited.

Attempts have been made to economically manufacture an 8 mm. moving picture camera arrangement in which sound may be recorded in synchronism with the photographed lip movements, however these attempts have met with very little success.

The use of sound stripes on 8 mm. films have increased the costs to the consumer since the consumer must pay the price of the special film having the sound stripe and further they must assume the cost of development. This type of film, which is presently in use, is not only very expensive it is generally not readily available.

Other disadvantages may be seen in the presently avaliable 8 mm. talking movie cameras in that the fidelity of sound recorded is very poor primarily because the sound recording equipment is disposed within the camera and the components are simply not sophisticated enough for attaining high quality sound reproduction and yet remain within the limits of a competitive price range.

Therefore, although means to circumvent the old method of taking talking picture movies on 8 mm. films have been tried, with little success, the major stumbling block appears to be the fact that it is very difficult, if not impossible, using present techniques to synchronize the recorded speech with the moving pictures, economically.

It has been generally felt that a solution to this problem would open the gates to the solution of many of the heretofore mentioned problems.

It is the general object of the present invention to avoid and overcome the foregoing and other difficulties of and objections to prior art practices by the provision of a moving picture camera which will also provide a synchronizing pulse.

Another object of the present invention is to provide a moving picture camera which will inexpensively provide a synchronizing pulse.

A further object of the present invention is to provide a moving picture camera which produces the equivalent of electronic sprocket holes.

Still a further object of the present invention is an inexpensive sturdily constructed 8 mm. moving picture camera which will produce a synchronizing pulse which may be transmitted to a remote point for use.

The aforesaid objects of the present invention, and other objects which will become apparent as the description proceeds, are achieved by providing a moving picture camera having a drive shaft therein. A housing integral with said camera having a rotatable shaft is disposed therein. A coupling means is provided to couple the rotatable shaft to the drive shaft within the camera. The rotatable shaft is provided with a pulse generating means mounted thereon and having a plurality of electric current conductors in communication therewith as well as current conveying means to bring electric energy to said housing means and to convey generated electric pulses away therefrom.

For a better understanding of the present invention reference should be had to the accompanying drawings, wherein like numerals of reference indicate similar parts throughout the several views and wherein:

FIGURE 1 is a perspective view of the present invention,

FIGURE 2 is a cross sectional view of the present invention taken along line 2—2 of FIGURE 1, FIGURE 3 is a perspective view of the pulse generating means, FIGURE 4 is a view in perspective of the coupling means, FIGURE 5 is a representation of the basic circuitry utilized, and FIGURE 6 is a representation, in general, of the pulses obtained from the pulse generating means.

Although the principles of the present invention are broadly applicable to moving picture cameras the present invention is particularly adapted for use in conjunction with an 8 mm. talking moving picture camera and hence it has been so illustrated and will be so described.

With specific reference to the form of the present invention illustrated in the drawings, and referring particularly to FIGURE 1, a moving picture camera or camera is indicated generally by the reference numeral 10.

As shown in FIGURE 1, the camera 10 may be provided with a housing means 12 on its outer surface 14. It may be noted that the housing means 12 as herein shown is an integral portion of the camera 10, however it may be made as an appendage and thereafter connected to the camera 10, if so desired. The housing means 12 may be provided with an ornamental exterior such as is shown in FIGURE 1. It should further be noted that the position of the housing means 12 on the outside surface 14 of the camera 10 may be of prime importance as will become apparent as the description proceeds.

The housing means 12, although shown in FIGURE 1 to be generally rectangular, may take other generally decorative shapes such as circular, square, oval or the like and is provided with a cover plate 16 of appropriate shape. It may be seen that the cover plate 16 protects the hollowed out portion 18 of the housing means 12 from dirt and other foreign matter generally detrimental to the operation of mechanical devices.

The housing means 12 is provided with a neck portion 20 which protrudes into the interior portion 22 of the camera 10 and may encircle the upper portion 24 of a camera drive shaft 26. As is well known in the art of 8 mm. moving picture cameras, the camera drive shaft 26 is driven by a wind motor (not shown) and generally pulls the film through the camera 10 by means of spindles or reels. The general operation of 8 mm. moving picture cameras need not be examined, since their operation is generally well known so that a detailed description would appear to be superfluous.

A rotatable shaft 28 may be mounted within the housing means 12 and may be rotatably supported at one end 30 by a bushing 32 fitted into a recess 34 in the cover plate 16. The other end portion 36 of the rotatable shaft 28 may fit through a bore 38 in the housing means 12 and thereby extend into the neck portion 20 of the housing means 12. Structurally, the bore 38 may be provided with a bushing 40 through which the rotatable shaft 28 may be fitted thereby affording a rotatable support for the other end portion 36 of the rotatable shaft 28. It may be noted at this point that the bushings 32, 40 may be of the sleeve type, or any convenient type bushing well known to those skilled in the art and made of well known material such as nylon or "Oilite."

In order that the camera drive shaft 26 may drive the rotatable shaft 28, the rotatable shaft 28 may extend into the neck portion 20 of the housing means 12. With this disposition of the rotatable shaft 28, the camera drive shaft 26 may be in close spaced relationship with the rotatable shaft 28 and in axial alignment with the same. In order that the rotatable shaft 28 may rotate with the camera drive shaft 26, a coupling means 42 may be provided which communicates between the camera drive shaft 26 and the rotatable shaft 28. The coupling means 42 comprises a plug 44 which may be adapted to be connected to the upper portion 24 of the camera drive shaft 26 by means of a fastening means 45 such that a key 46 on said plug 44 may extend uprightly toward a driven receptacle 48 which may be connected to or in communication with the end portion (other end portion 36) of the rotatable shaft 28. The driven receptacle 48 may be provided with a plurality of keyways 50 which are capable of receiving the key 46 of the plug 44. In operation, the key 46 fits into one of the plurality of keyways 50 such that when the camera drive shaft 26 rotates, the plug 44 rotates as well. Since the key 46 may be engaged in one of the plurality of keyways 50 on the driven receptacle 48 it may be driven at the same rate of speed as the camera drive shaft 26 and hence the rotatable shaft 28 will also be driven at the same rate. Therefore, the camera drive shaft 26 and the rotatable shaft 28 of the housing means 12 are coupled together by means of the coupling means 42 resulting in the two shafts 26, 28 rotating at the same rate of speed and in synchronism. That is, the camera drive shaft 26, which rotates the camera spindles or reels (not shown) internally of the camera 10, and the rotatable shaft 28, which rotates internally of the housing means 12, are in such communication that they may rotate at the same speed and in synchronism.

In order to connect the rotatable shaft 28 to the driven receptacle 48, the other end of the shaft 36 is squared 51 and the square portion 51 is engageable in a squared hole 49 in the rear portion 54 of the driven receptacle 48.

As shown in FIGURE 2, a resilient means or spring 52 is mounted around the rotatable shaft 28 and acts between the bushing 40 and the rear portion 54 of the driven receptacle 48. The driven receptacle therefore may be permitted to have a degree of free movement axially such that if the key 46 of the plug 44 is not aligned properly with one of the plurality keyways 50, this misalignment may adjust itself since the driven receptacle 48 may "give" slightly when the camera drive shaft 26 begins to rotate into or slide into one of the plurality of keyways 50. In this manner a self adjusting coupling means 42 is provided. Further, the spring 52 may thereafter provide a pressure against the rear portion 54 of the driven receptacle 48 thereby helping to maintain a firm coupling relationship between the plug 44 and the driven receptacle 48.

As further shown in FIGURE 2, a pulse generating means 56 may be mounted on the rotatable shaft 28 such that it may rotate within the housing means 12 and in relation to the camera drive shaft 26. The pulse generating means 56 may have a generally disc-like form with an electrically insulated aperture 58 in the center thereof through which the rotatable shaft 28 may be fitted.

Referring particularly to FIGURE 3 the pulse generating means 56 may be made of a non-electrically conductive material in general, such as plastic or the like, and yet having portions thereof composed of electrically conductive material such as brass or the like material. The pulse generating means 56 may be provided with an electrically conductive inner rim 60 surrounding the electrically insulated aperture 58 and having electrically conductive portions or spokes 62 leading radially from the inner rim 60 to the outer periphery 64 of the disc-like pulse generating means 56 analogous to a spoked wheel, the spokes and inner rim thereof being composed of electrically conductive material and having interspersed therebetween, areas of non-conductive material 66.

One convenient manner of obtaining a pulse from the aforedescribed combination of elements may be to electrically activate the conductive material (inner rim 60 and spokes 62) of the pulse generating means 56 and provide a means for extracting the electric current from the pulse generating means 56 at some point along its outer periphery 64. At the point of such extraction there would appear a surge of energy when a spoke 62 passed such point and no energy surge when an area of nonconductive material 66 passed such point. Hence it may be seen that at the point of extraction an interrupted surge of energy would appear, or more specifically, a series of pulses as shown in FIGURE 6.

The electrical circuitry arrangement shown generally in FIGURE 5 may be one convenient circuit arrangement for accomplishing the desired series of pulses.

One convenient structural arrangement to produce or generate the series of pulses shown in FIGURE 6 would be to provide a brush box 68 within the housing means 12. A plurality of openings 70 may be provided in the housing means 12 such that an energy source 72 such as a battery, or the like, may supply electrical energy to the brush box 68 by means of a conduit 73 which will be connected to the brush box 68 from the energy source.

A first brush or current conveying means 74 may be connected to the brush box 68 and to the conduit 73, which is carrying energy from the energy source 72, and may be in constant communication with the inner rim 60 (as shown in FIGURE 2). In this manner all the electrically conductive material which comprises the pulse generating means 56 may be provided with an electrical charge. A second brush or current extracting means 76 may be in constant communication with either the outer periphery 64 or other surface area 78, where there are presented alternate areas of nonconductive material 66 and spokes 62. It is of interest to note that the second brush 76 will extract the energy, from the pulse generating means 56, in the form of pulses (see FIGURE 6) as the pulse generating means 56 rotates and presents, alternately, conductive (spokes 62) and nonconductive areas 66 to it (second brush 76). By means of a second conduit 80 these pulses may be directed away from the pulse generating means 56, through the brush box 68 and opening 70, to a remote point where they may be utilized for synchronizing purposes.

With this arrangement of elements a series of pulses may be generated which may be a function of or related to the number of sprocket holes in 8 mm. film which is being used in the camera 10; or a function of the number of frames of pictures taken in a fixed time period. In reality these relationships may be varied by the function of the speed of the camera drive shaft 26 and its relationship with the rotatable drive shaft 28.

Referring now particularly to the relationship of the number of sprocket holes (not shown) in the 8 mm. film to the number of pulses generated (see FIGURE 6), it may be seen that by choosing the appropriate pulse generating means 56 with the appropriate number of electrically conductive spokes 62 and determining the speed of rotation of the pulse generating means 56, a pulse may be generated for every sprocket hole in the film utilized to take the sought after moving pictures. In a real sense electronic sprocket holes are generated through the generation of the series of pulses previously described. Various ratios may be obtained between the film sprocket holes and the generated pulses or "electronic sprocket holes."

Referring now to FIGURE 2, the rotatable shaft 28 is provided with a thrust bearing 82 at one end 30, and another shaft 28 may have a limited amount of longitudinal excursion during its rotary motion. As previously stated, the resilient means or spring 52 is provided in the neck portion 20 of the housing means 12 so that the driven receptacle 48 may be urged against the plug 44 of the camera drive shaft 26, thereby maintaining a constant communication in the coupling means 42 between the plug 44 and the driven receptacle 48.

As previously stated, the preferred arrangement provides for the placement of the housing means 12 such that the rotatable shaft 28 might be in alignment with camera shaft 26. However, it may be seen that alternatively these shafts may be offset and may be coupled together for rotation by means of a flexible shaft (not shown). It may be clear therefore that although the alignment of the camera drive shaft 26 and the rotatable shaft 28 is preferred, other arrangements may be used without departing from the essence of the invention.

In operation, the housing means 12 is integral with the camera 10 and the rotatable shaft 28, may be brought into communication with the camera drive shaft 26 through the coupling means 42. The conduit 73 provides electrical energy at the pulse generating means 56 through the first brush 74, such that the pulse generating means 56 is in an energized state. The second brush 76 is also in position in communication with the surface area 78 of the pulse generating means 56. When the operator activates the camera drive shaft 26, as when he wants to take moving pictures, the rotatable shaft 28 will rotate thereby causing the pulse generating means 56 to rotate. The second brush or current extracting means 76 will then have presented to it energized electrically conductive portions or spokes 62 and areas of non-conductive material 66, such that it will see a series of generated electrical impulses or pulses which may thereafter be directed from the housing means 12 through the brush box 66 and the second conduit 80 to some remote point 86 or outside facility. It may therefore be seen that if the number of electrically conductive portions or spokes 62, on the pulse generating means 56, are related to the sprocket holes (not shown) on the film utilized in the camera 10, electronic sprocket holes may be generated which may be used for synchronizing purposes some distance from the camera 10.

It will be recognized by those skilled in the art, that the objects of the present invention have been achieved by providing an 8 mm. moving picture camera which may generate, inexpensively, a plurality of synchronizing pulses.

While in accordance with the patent statutes a preferred embodiment of the present invention has been illustrated and described in detail, it is to be particularly understood that the invention is not limited thereto or thereby.

I claim:

1. In a moving picture camera having a camera drive shaft therein, a means for providing pulses comprising a housing means, a rotatable shaft rotatably mounted within said housing means and adjustable spring loaded slotted shaft arrangement connected to said camera drive shaft and said rotatable shaft for coupling said camera drive shaft to said rotatable shaft, a pulse generating means mounted on said rotatable shaft, current conveying means in communication with said pulse generating means, and current extracting means in communication with said pulse generating means for removing said pulses to a remote point.

2. In a moving picture camera having camera drive shaft a means for providing pulses comprising a housing means, a rotatable shaft rotatably mounted within said housing means, an adjustable spring loaded slotted shaft arrangement connected to said camera drive shaft and said rotatable shaft for coupling said camera drive shaft to said rotatable shaft, a pulse generating means mounted on said rotatable shaft, a first brush means in communication with said pulse generating means for bringing electrical energy to said pulse generating means, and a second brush means in communication with said pulse generating means for removing said pulses to a remote point.

3. In a moving picture camera having a camera drive shaft a means for providing pulses comprising a housing means integral with the moving picture camera, a rotatable shaft rotatably mounted within said housing means, said rotatable shaft being in axial alignment with said camera drive shaft, an adjustable spring loaded slotted shaft arrangement connected to said camera drive shaft and said rotatable shaft for coupling said camera drive shaft to said rotatable shaft, a pulse generating means mounted on said rotatable shaft, a current conveying means in communication with said pulse generating means, and current extracting means in communication with said pulse generating means for removing said pulses to a remote point.

4. In a moving picture camera having a camera drive shaft, a means for providing pulses comprising a housing means integral with the moving picture camera, a rotatable shaft rotatably mounted within said housing means, said rotatable shaft being in axial alignment with said camera drive shaft, an adjustable spring loaded slotted shaft arrangement connected to said camera drive shaft and said rotatable shaft for coupling said camera drive shaft to said rotatable shaft, a pulse generating means mounted on said rotatable shaft, a first brush means in communication with said pulse generating means bringing electrical energy to said pulse generating means, and current extracting means in communication with said pulse generating means for removing said pulses to a remote point.

5. In a moving picture camera having a camera drive shaft, a means for providing pulses comprising housing means, integral with the moving picture camera, a rotatable shaft rotatably mounted within said housing means, said rotatable shaft being in axial alignment with said camera drive shaft, a key connected to said camera drive shaft, a driven receptacle connected to said rotatable shaft provided with a multiplicity of keyways, said key being insertable in one of said multiplicity of keyways such that when said camera drive shaft rotates said rotatable shaft will be rotated, a resilient means in communication with said driven receptacle urging said driven receptacle toward said key, a pulse generating means mounted on said rotatable shaft, current conveying means in communication with said pulse generating means bringing electrical energy to said pulse generating means, and current extracting means in communication with said pulse generating means for removing said pulses to a remote point.

6. In a moving picture camera having a camera drive shaft, a means for providing pulses comprising a housing means integral with the moving picture camera, a rotatable shaft rotatably mounted within said housing means, said rotatable shaft being in axial alignment with said camera drive shaft, a key connected to said camera drive shaft, a driven receptacle connected to said rotatable shaft provided with a multiplicity of keyways, said key being insertable in one of said multiplicity of keyways such that when said camera drive shaft rotates said rotatable shaft will be rotated, a resilient means in communication with said driven receptacle urging said driven receptacle toward said key, a pulse generating means mounted on said rotatable shaft, a first brush means in communication with said pulse generating means for bringing electrical energy to said pulse generating means, means bringing electrical energy to said pulse generating means, and current extracting means in communication with said pulse generating means for removing said pulses to a remote point.

7. In a moving picture camera according to claim 1 said pulse generating means comprises a disc-like structure of generally electrically nonconductive material and having an electrically insulated aperture in the center thereof, an inner rim of electrically conductive material contiguous with said insulated aperture, a multiplicity of electrically conductive portions connected to said inner rim and extending radially therefrom to the outer periphery of said disc-like structure, and a multiplicity of areas of electrically nonconductive material interspersed between said electrically conductive portions thereby providing alternating electrically conductive portions and areas of electrically nonconductive material.

8. In a moving picture camera having a camera drive shaft therein, a means for providing pulses comprising a housing means integral with the moving picture camera, a rotatable shaft rotatably mounted within said housing means, said rotatable shaft being in axial alignment with said camera drive shaft, a coupling means connected to said camera drive shaft and said rotatable shaft for coupling said camera drive shaft to said rotatable shaft, a disc-like structure of generally nonconductive material and having an electrically insulated aperture in the center thereof, an inner rim of electrically conductive material contiguous with said insulated aperture, a multiplicity of electrically conductive portions connected to said inner rim and extending radially therefrom to the outer periphery of said disc-like structure, a multiplicity of areas of electrically nonconductive material interspersed between said electrically conductive portions thereby providing alternating electrically conductive portions and areas of electrically nonconductive material, current conveying means in communication with said inner rim for bringing electrical energy thereto and energizing said electrically conductive portions, and a current extracting means in communication with the alternating electrically conductive portions and areas of electrically nonconductive material for removing said pulses to a remote point.

9. In a moving picture camera having a camera drive shaft therein, a means for providing pulses comprising a housing means integral with the moving picture camera, a rotatable shaft rotatably mounted within said housing means, said rotatable shaft being in axial alignment with said camera drive shaft, a key connected to said camera drive shaft, a driven receptacle connected to said rotatable shaft provided with a multiplicity of keyways, said key being insertable in one of said multiplicity of keyways such that when said camera drive shaft rotates said rotatable shaft will be rotated, a resilient means in communication with said driven receptacle urging said driven receptacle toward said key, a disc-like structure of generally nonconductive material and having an electrically insulated aperture in the center thereof, an inner rim of electrically conductive material contiguous with said insulated aperture, a multiplicity of electrically conductive portions connected to said inner rim and extending radially therefrom to the outer periphery of said disc-like structure, a multiplicity of areas of electrically nonconductive material interspersed between said electrically conductive portions thereby providing alternating electrically conductive portions and areas of electrically nonconductive material, current conveying means in communication with said inner rim for bringing electrical energy thereto and energizing said electrically conductive portions, and a current extracting means in communication with the alternating electrically conductive portions and areas of electrically nonconductive material for removing said pulses to a remote point.

10. In a moving picture camera having a camera drive shaft therein, a means for providing pulses comprising a housing means integral with the moving picture camera, a rotatable shaft rotatably mounted within said housing means, said rotatable shaft being in axial alignment with said camera drive shaft, a key connected to said camera drive shaft, a driven receptacle connected to said rotatable shaft provided with a multiplicity of keyways, said key being insertable in one of said multiplicity of keyways such that when said camera drive shaft rotates said rotatable shaft will be rotated, a resilient means in communication with said driven receptacle urging said driven receptacle toward said key, a disc-like structure of generally nonconductive material and having an electrically insulated aperture in the center thereof, an inner rim of electrically conductive material contiguous with said insulated aperture, a multiplicity of electrically conductive portions connected to said inner rim and extending radially therefrom to the outer periphery of said disc-like structure, a multiplicity of areas of electrically nonconductive material interspersed between said electrically conductive portions and areas of electrically nonconductive material, a first brush means in communication with said inner rim for bringing electrical energy thereto and energizing said electrically conductive portions, and a second brush means in communication with the alternating electrically conductive portions and areas of electrically nonconductive material as the disc-like structure rotates for removing said pulses to a remote point.

11. A pulse generating means for connection to a camera having a camera drive shaft disposed therein, a camera housing means, a rotatable shaft rotatably mounted within said housing means in axial alignment with said camera drive shaft and having one portion thereof extending into said camera housing means, an adjustable spring loaded slotted shaft arrangement connected to said camera drive shaft and said rotatable shaft, current conveying means in communication with said pulse generating means, and current extracting means in communication with said pulse generating means for removing said pulses to a remote point.

12. A pulse generating means for connection to a camera having a camera drive shaft disposed therein comprising a housing means, said housing means being provided a neck portion capable of insertion into said camera, a rotatable shaft rotatably mounted within said housing means in axial alignment with said camera drive shaft and having one portion thereof extending into said neck portion, a coupling means disposed within said neck portion and connected to said camera drive shaft and said rotatable shaft, current conveying means in communication with said pulse generating means, and current extracting means in communication with said pulse generating means for removing said pulses to a remote point.

References Cited by the Examiner

UNITED STATES PATENTS

| 514,990 | 2/1894 | Habersang et al. |
| 970,793 | 9/1910 | Carlson _____ 64—9 |
| 2,756,293 | 7/1956 | Bitler. |
| 2,971,174 | 2/1961 | Lyon. |

ROBERT K. SCHAEFER, *Primary Examiner.*

ROBERT S. MACON, *Examiner.*

J. R. SCOTT, *Assistant Examiner.*